(12) United States Patent
Amaduzzi

(10) Patent No.: US 7,121,527 B2
(45) Date of Patent: Oct. 17, 2006

(54) INTERCEPT VALVE FOR SPRAY GUNS FOR WATER CLEANER APPARATUS

(75) Inventor: Roberto Amaduzzi, Rubiera (IT)

(73) Assignee: Arrow Line SRL, Rubiera (IT)

(*) Notice: Subject to any disclaimer, the term of this patent is extended or adjusted under 35 U.S.C. 154(b) by 0 days.

(21) Appl. No.: 11/092,823

(22) Filed: Mar. 30, 2005

(65) Prior Publication Data

US 2005/0230654 A1 Oct. 20, 2005

(30) Foreign Application Priority Data

Apr. 15, 2004 (IT) ............... RE2004A0033

(51) Int. Cl.
*F16K 1/00* (2006.01)
(52) U.S. Cl. .................... 251/303; 251/337
(58) Field of Classification Search ........... 251/298, 251/303, 336, 337
See application file for complete search history.

(56) References Cited

U.S. PATENT DOCUMENTS

| 258,432 | A | * | 5/1882 | Keith ................... 251/303 |
| 1,324,515 | A | * | 12/1919 | Otti ................... 137/527.8 |
| 2,271,715 | A | * | 2/1942 | Saffell et al. ........... 251/110 |
| 2,355,205 | A | * | 8/1944 | Daun ................... 137/600 |
| 2,373,294 | A | * | 4/1945 | Cornelius .............. 137/600 |
| 2,873,941 | A | * | 2/1959 | Kortchmar ............. 251/148 |
| 2,927,601 | A | * | 3/1960 | Devereaux et al. ...... 137/271 |
| 3,525,359 | A | * | 8/1970 | Short ................... 137/553 |
| 5,913,505 | A | * | 6/1999 | Ouvrard et al. ......... 251/303 |
| 6,585,173 | B1 | * | 7/2003 | Schmon et al. ......... 239/526 |
| 6,808,122 | B1 | * | 10/2004 | Mitcheli ............... 239/11 |

* cited by examiner

*Primary Examiner*—J. Casimer Jacyna
(74) *Attorney, Agent, or Firm*—Young & Thompson

(57) ABSTRACT

The spray gun is subdivided into a first body (4), in ternally of which a cavity (6) is afforded, and a second body (5) which is perpendicular to the first body (4) and internally afforded a through hole (25) communicating with the cavity (6). An obturator (14) is present internally of the cavity (6), on which obturator (14) elastic means (21) act. Means for activating (26) are located internally of the through hole (25), which activate the obturator (14) and open into the cavity (6) and are in contact with the obturator (14).

9 Claims, 4 Drawing Sheets

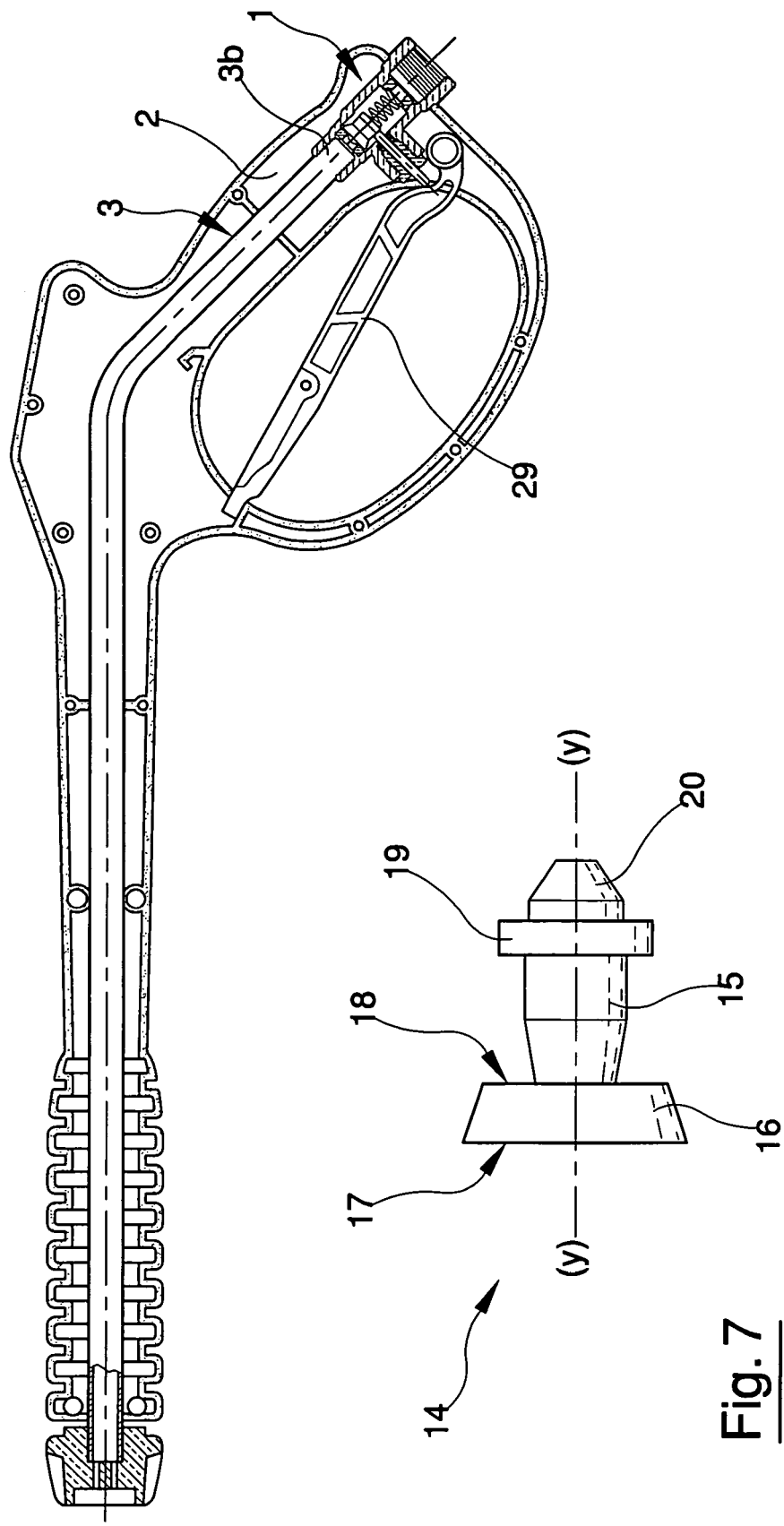

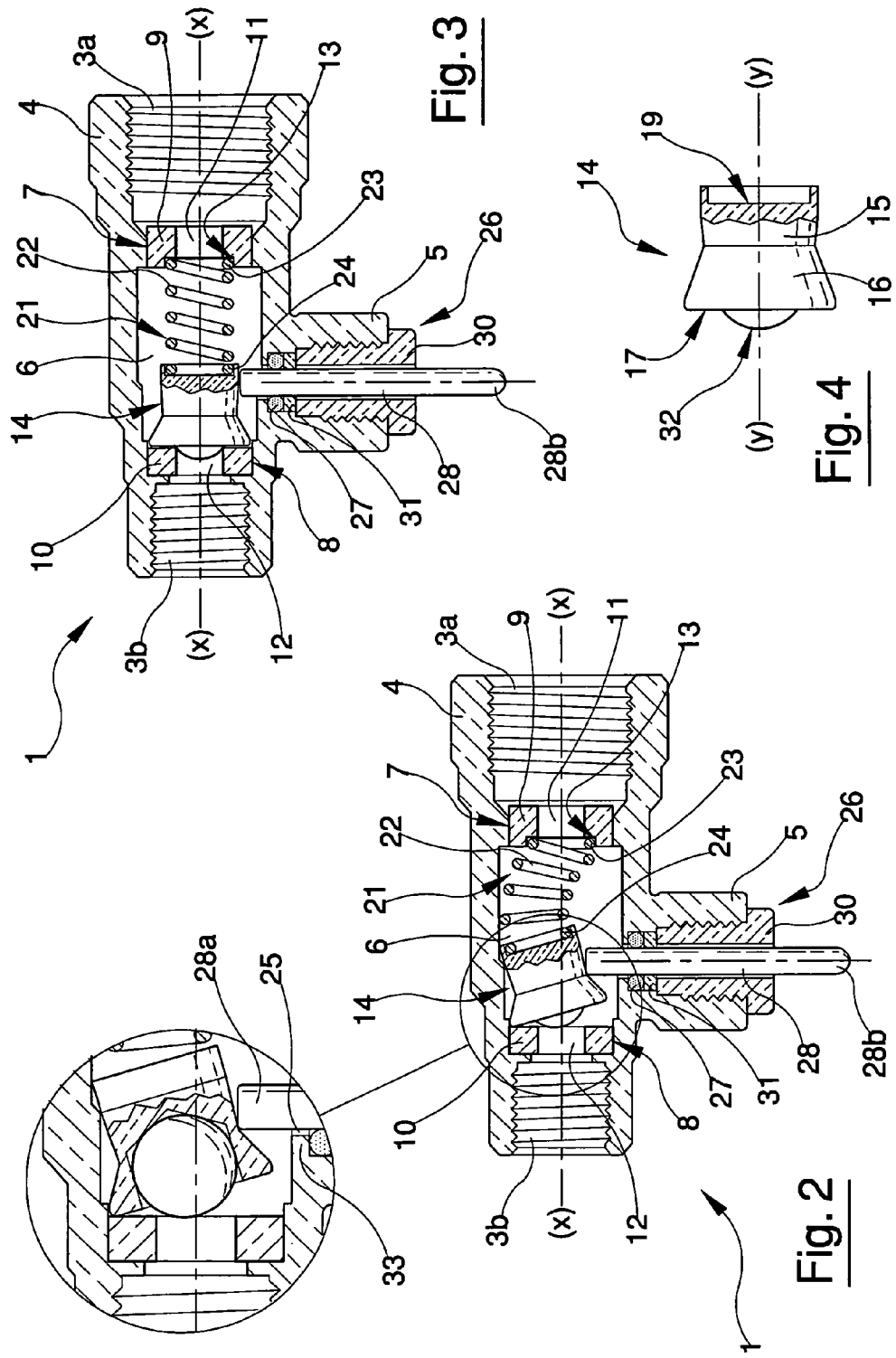

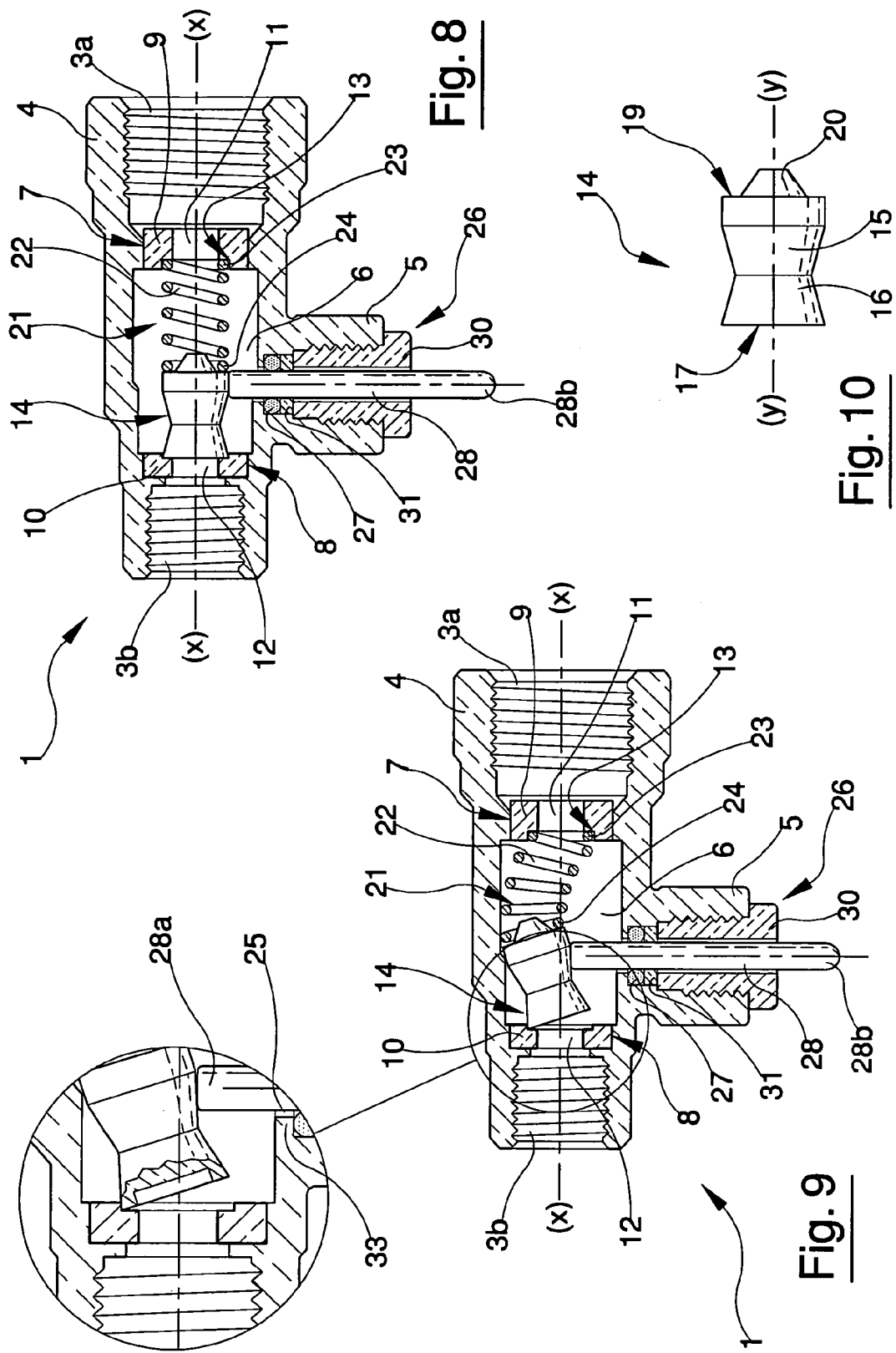

INTERCEPT VALVE FOR SPRAY GUNS FOR WATER CLEANER APPARATUS

BACKGROUND OF THE INVENTION

Intercept valves are generally located in a conduit and when activated by means for activating are able either to allow or interrupt passage of a fluid flowing internally of the conduit, with a simple on-off mechanism of either complete opening or complete shutting.

In the field of spray guns in water spray equipment, the fluid crossing the valves is conveyed under very high pressure, which can be up to 350 bar. Consequently the design of the valves is such that much attention has been paid not only to guarantee good operation at pressures which can go above the above-mentioned reference values, but also to provide a long working life. The prior art includes, for example, European patent No. EP0572237, which teaches a spray gun provided with a double-acting valve activated by a trigger. This solution is not adaptable to the field of water-spray guns, since the latter operate at high pressure and delivery rates and must marry simplicity of assembly with low weight, and also offer very good leak-proof characteristics. Another known solution is U.S. Pat. No. 5,913,505, which includes a lever system of on-off activation of the valve.

This system too, which exhibits coaxial fluid inlet and outlet, cannot be applied on water spray guns since it has the drawback of being constructionally very complex, having a high number of components and being rather unwieldy. Further, a spray gun fitted with a device of this type for fluid interception would lose its characteristic of ready response to valve opening and closure.

Also known in the prior art are fluid passage regulation valves, such as for example U.S. Pat. No. 3,525,359, which with a discrete movement of a pivot on an obturator the fluid can be regulated in output.

This solution is not usable on water guns because apart from the fact that they do not exhibit coaxial fluid inlet and outlet, limiting the load losses, in this type of gun a sharp interception of the fluid is required, a characteristic which is unobtainable with a discrete movement of a pivot on an obturator.

The Applicant designed an intercept valve with a spherical obturator, in Italian patent application no. RE2002A000102.

This valve, which is interpositioned between a tube from which the jet of fluid exits and a further supply tube, coaxial to the first, exhibits an internal cavity in which an spherical obturator is arranged, which obturator abuts on a fluid passage seal and is subjected to the action of a manually-operated pushing element.

The hydrostatic force of the pressurised fluid causes a thrust on the spherical obturator which favours closure of the conduit on which the valve is located, while the activation of the pusher, by acting on the obturator, enables the conduit to open.

Following prototype construction and testing the Applicant's product displayed some drawbacks.

The continuous dragging of the obturator, which is made of metal, on the seal, which is made of plastic, following opening and closing of the valve, causes wear and leads to damage on the contact surface of the seal.

This phenomenon is made worse when the fluid contains suspended abrasive substances.

Taking into account that spray guns for washing apparatus are usually capable of working at high and low fluid pressures, wear on the seal can present a further drawback.

Though at high pressure the hydrostatic force generated by the fluid enables closure of the obturator on the albeit worn seal, at low pressure the hydrostatic force generated is not sufficient to guarantee a perfect seal of the obturator on the worn seal, the result being a loss of fluid even when the valve is closed. The main aim of the present invention is to adapt a fluid intercept valve which is provided with an obturator that does not generate wear on the seal it abuts. A further aim of the present invention is to provide a fluid intercept valve which is provided with an obturator that can reduce the force needed to commute the valve from the open position to the closed position in comparison with other valves.

A further aim of the invention is to provide a fluid intercept valve which enables a variation of the force needed to displace the obturator into the open position during design stage, by modifying the point of application of the pushing element and consequently the longitudinal development of the obturator.

The technical objective and set aims are all attained by the fluid intercept valve, which is characterised in that it comprises one or more of the technical solutions claimed herein below.

SUMMARY OF THE INVENTION

The spray gun is subdivided into a first body (4), internally of which a cavity (6) is afforded, and a second body (5) which is perpendicular to the first body (4) and internally afforded a through hole (25) communicating with the cavity (6). An obturator (14) is present internally of the cavity (6), on which obturator (14) elastic means (21) act. Means for activating (26) are located internally of the through hole (25), which activate the obturator (14) and open into the cavity (6) and are in contact with the obturator (14).

BRIEF DESCRIPTION OF THE DRAWINGS

A non-limiting example of the invention is now described, in a preferred but non-exclusive embodiment of the intercept valve of the invention, illustrating by way of example in the accompanying figures of the drawings, in which:

FIG. 1 is a lateral longitudinal section of a spray gun including the intercept valve of the invention;

FIG. 2 is a longitudinal section of the intercept valve of the invention in an open position and provided with a first geometrical conformation of the obturator;

FIG. 3 is a longitudinal section of the intercept valve of the invention in a closed position and exhibiting the first geometrical conformation of the obturator;

FIG. 4 is an enlarged-scale detail of the first geometrical conformation of the obturator internally of the intercept valve;

FIG. 7 is an enlarged-scale detail of the second geometrical conformation of the obturator inside the intercept valve;

FIG. 8 is a longitudinal section of the intercept valve of the invention in the open position and exhibiting a third geometrical conformation of the obturator;

FIG. 9 is a longitudinal section of the intercept valve of the invention in the closed position and exhibiting the third geometrical conformation of the obturator;

FIG. 10 is an enlarged-scale detail of the third geometrical conformation of the obturator inside the intercept valve.

DESCRIPTION OF THE PREFERRED EMBODIMENTS

Figures 5, 6:
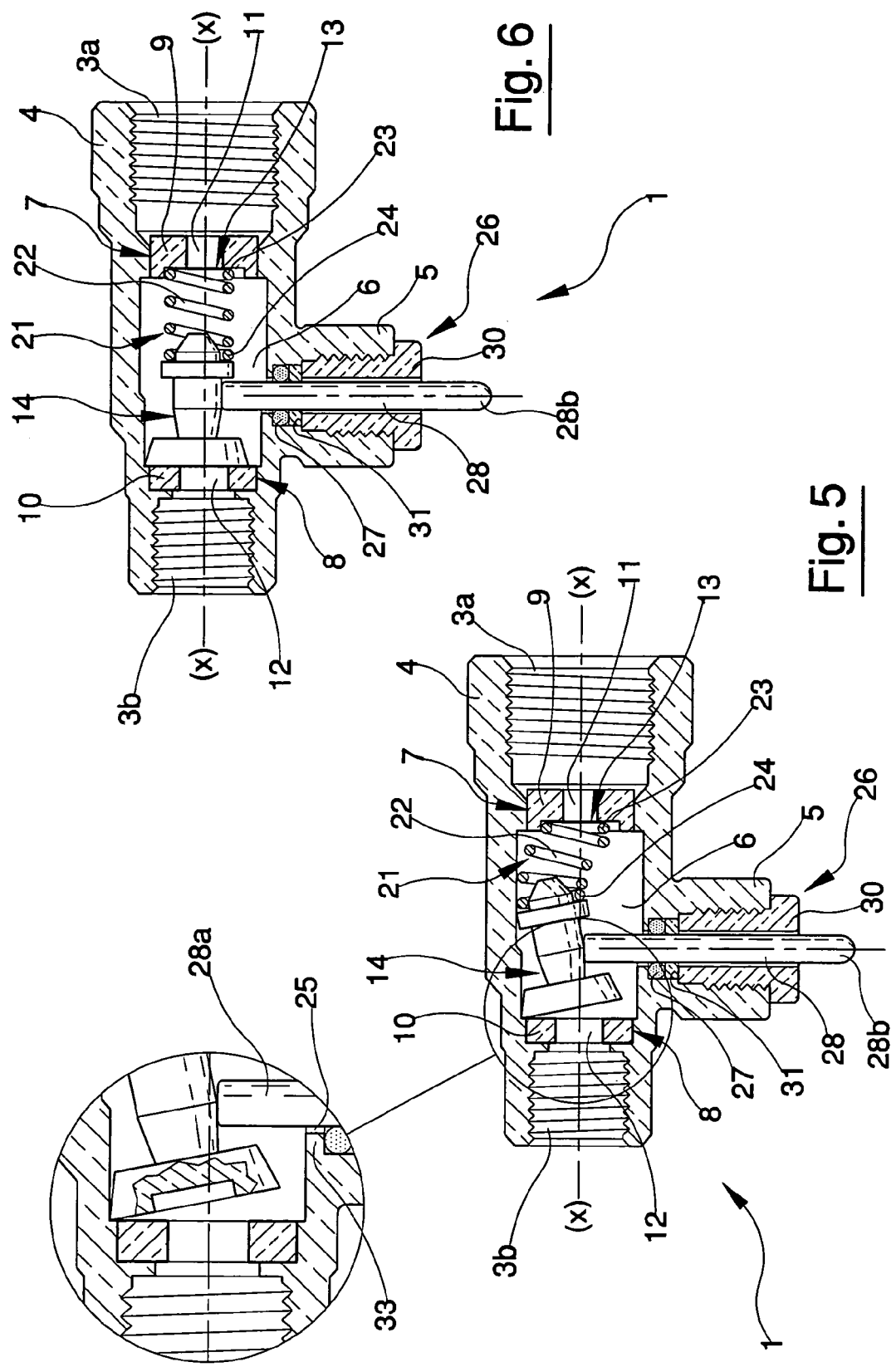
FIG. 5 is a longitudinal section of the intercept valve of the invention in an open position and exhibiting a second geometrical conformation of the obturator.
FIG. 6 is a longitudinal section of the intercept valve of the invention in a closed position and exhibiting the second geometrical conformation of the obturator.

With reference to the figures of the drawings the intercept valve of the invention is denoted in its entirety by 1.

The intercept valve 1, internally located in a spray gun 2, is interpositioned in a fluid conduit 3 in order to allow passage of a fluid internally of the conduit, or to stop same.

The intercept valve 1 is advantageously sub-divided into a first body 4, preferably having a longitudinally development, and a second body 5, preferably having a transversal development and perpendicular to the first body 4.

The first body 4 internally exhibits a cavity 6, preferably cylindrical, which upstream communicates with a fluid inlet conduit 3*a*, which operates as a fluid supply channel, and downstream with a fluid outlet conduit 3*b*.

The fluid inlet conduit 3*a* and the outlet conduit 3*b*, preferably coaxial to one another, form the fluid conduit 3 which crosses the whole spray gun 2.

At the opposite lateral ends of the cavity 6, interpositioned between the cavity 6 and the fluid inlet conduit 3*a*, are a first section change 7, and between the cavity 6 and the fluid outlet conduit 3*b*, a second section change 8.

A first annular body 9 and a second annular body 10 are located internally of the first section change 7 and the second section change 8.

The first annular body 9 internally exhibits a first opening 11 for fluid transport from the entry 3*a* conduit to the cavity 6, and exhibits, in proximity of the cavity 6, a widening 13 which functions as a rest seating for a spring 22.

The second annular body 10 internally exhibits a second opening 12 for fluid transport from the cavity 6 to the outlet 3*b* conduit.

The first annular body 9 and the second annular body 10 are preferably made of a plastic material and act as seals between the respective joints between the inlet conduit 3*a* and the outlet conduit 3*b* and the valve 1.

An obturator 14 is located internally of the cavity 6, which obturator 14 is conformed as a body of rotation along an axis Y—Y and has a first tract 15 which faces the first annular body 9 and a second tract 16 which is at least partially in contact with the second annular body 10.

The obturator 14, the first annular body 9 and the second annular body 10 are coaxial when the valve 1 is in the closed position.

In a first embodiment, illustrated in FIG. 4, the second tract 16 of the obturator 14 exhibits a first side 17 which is in at least partial contact with the second annular body 10, and terminates in connection with the first tract 15.

In a practically central position of the first side 17 is a projection 32, conformed as a spherical cap, which abuts, when the valve 1 is in the closed position, against the internal walls of the second opening 12 of the second annular body 10, which it faces.

The second tract 16 exhibits a preferably trapezoid transversal section, with the first side 17 identifying the larger side of the trapezoid section.

The second tract 15 of the obturator 14 exhibits a striker element 19 afforded on a portion of the second tract 15 which faces the first annular body 9.

In a second embodiment, illustrated in FIG. 7, the second tract 16 of the obturator 14 exhibits a first side 17 in at least partial contact with the second annular body 10, and an opposite side 18 specially connected to the second tract 15.

The second tract 16 exhibits a transversal section which is preferably trapezoid with the first side 17 identifying the larger side of the trapezoid section, and the opposite side identifying the smaller side thereof.

The second tract 16 of the obturator 14, preferably cylindrical with a smaller transversal section with respect to the opposite side 18 to which it is connected, exhibits a striker element 19 and terminates with a reduction 20 of section.

In a third embodiment, illustrated in FIG. 10, the second tract 16 exhibits a trapezoid transversal section with a first side 17, identifying the larger side of the trapezoid section, in at least partial contact with the second annular body 10.

The second tract 15 of the obturator 14 exhibits a striker element 19 and terminates in a reduction 20 of section.

Elastic means 21 are also present in the cavity 6, which elastic means 21 act on the obturator 14 and are preferably constituted by a spring 22 having a first end 23, which is housed internally of the section widening 13 of the first annular body 9, and an opposite end 24 coupled, thanks to the section narrowing 20, to the second tract 16 up until it rests on the striker element 19.

A through hole 25 is afforded in the transversal second body 5 of the intercept valve 1, which through hole 25 is in communication with the cavity 6 and ends in proximity thereof, with a section narrowing 33.

The means for activating 26 of the obturator 14 are located internally of the through hole 25, which means for activating 26 are constituted by an axially-sliding pivot 28.

The means for activating 26 include the presence of a seal 27 for preventing escape of fluid from the hole 25, internally of which hole 25 the pivot 28 is free to sealedly oscillate on command of a control lever 29.

The means for activating 26 further comprise a lock nut 30 which keeps the seal 27 pressed, thus guaranteeing a sealing of the entire system, and a striker element 31 interpositioned between the lock nut 30 and the seal 27 to protect the seal 27.

The pivot 28 exhibits a first end 28*b* connected to the control lever 29 and a second end 28*a* in contact with the first tract 15 of the obturator 14.

The intercept valve functions as described herein below.

Without performing any manoeuvre on the control lever 29 the intercept valve is in the closed position and the axis Y—Y of the obturator 14 is parallel with the axis X—X.

In this position the fluid passage between the inlet conduit 3*a* and the exit conduit 3*b* is interrupted.

The interruption of the fluid passage is due to the obturator 14 which exhibits, in the closed valve conformation, the first side 17 totally in contact with the second annular body 10 (FIGS. 3, 6, 9).

In this conformation the first side 17 closes the second opening 12 of the second annular body 10 and the pressurised fluid stays inside the cavity 6 of the intercept valve 1.

The adherence of the obturator 14 to the second annular body 10 is improved by the presence of the spring 22 which generates a closing force oriented parallel to the axis of the obturator 14, the first annular body 9 and the second annular body 10.

An action on the control lever 29 moves the intercept valve 1 into the open position (FIGS. 2, 5, 9).

In this position the pivot 28 of the means for activating 26, by performing a vertical translation, generates a force on the intercept valve 1 which is perpendicular to the closing force.

The second end 28a of the pivot 28 causes a vertical thrust on the obturator 14 which favours a partial detachment of the obturator 14 from the second seal 10.

This partial detachment is due to the special geometrical conformation of the obturator 14 which converts the vertical translation of the pivot 28 into an angular displacement of the obturator 14.

The trapezoid conformation of the transversal section of the first tract 16, having oblique walls, causes a striking of the first side 17 on the lateral wall of the cavity 6, with a consequent rotation on the strike zone of the obturator 14. Consequently the axis Y—Y of the obturator 14 is angled with respect to the axis X—X.

At this point the fluid inlet 3a and the fluid outlet 3b are in reciprocal communication and are crossed by the pressurised fluid.

The intercept valve exhibits a further advantage.

In fact, in a case in which it is necessary to operate with greater pressure values than the ones mentioned herein above, there will be an increase in the operating thrust on the intercept valve 1 to contrast the increase in closing force thereon.

An increase in the thrust causes a retarded and awkward response of the means for activating.

To obviate this problem the entity of the closing force can be reduced, by reducing, for example, the diameter of the second opening 12 and thus reducing the seal surface.

This modification causes, however, a reduction in the fluid passage hole with a consequently unfavourable increase in load loss.

By increasing the distance d running between the strike zone of the obturator 14 and the point of application of the pivot 28 on the obturator 14, i.e. increasing the arm of the activating force of the intercept valve 1, a reduction of the entity of the changing force is obtained, without penalising the fluid delivery.

What is claimed is:

1. An intercept valve for spray guns for water cleaner apparatus, comprising:
    a first body (4), preferably having a longitudinal development, internally exhibiting a cavity (6) and having upstream thereof a first section change (7) facing a fluid inlet conduit (3a) and having downstream thereof a second section change (8) facing a fluid outlet conduit (3b), the inlet conduit (3a) and the outlet conduit (3b) being coaxial along a longitudinal axis (X—X);
    a second body (5), developing transversally with respect to the first body (4) and communicating with the cavity (6) through a through hole (25) ending in proximity of the cavity (6) with a section narrowing (32);
    a first annular body (9) and a second annular body (10) located respectively in the first section change (7) and the second section change (8), being provided, respectively with a first opening (11) and a second opening (12);
    an obturator (14) developing longitudinally and being conformed as a body of rotation according to an axis (Y—Y), and being arranged internally of the cavity (6), having a first tract (15) which exhibits a striker element (19) and a second tract (16) exhibiting a first side (17) in at least partial contact with the second annular body (10);
    elastic means (21), arranged internally of the cavity (6) and acting on the obturator (14) by means of the striker element;
    means for activating (26) the obturator (14), located internally of the second body (5) and terminating, through the through hole (25), in contact with the obturator (14);
    characterised in that the obturator (14) defines a closed-valve position when the axis (Y—Y) of the intercept valve (1) is parallel to the axis (X—X) of the first body (4) and defines an open-valve position when, following action of the means for activating (26), the axis (Y—Y) of the obturator (14) assumes an angled position with respect to the axis (X—X).

2. The intercept valve of claim 1, characterised in that the first side (17) of the obturator (14), in a first embodiment thereof, exhibits a projection (32) which is central of the first side (17) and is shaped as a spherical cap.

3. The intercept valve of claim 1, characterised in that the first side (17) of the obturator (14), in a second embodiment thereof, has a flat surface.

4. The intercept valve of claim 1, characterised in that the second opening (12) of the first annular body (9) terminates in the cavity (6) with a widening (13) which functions as a base for housing the elastic means (21).

5. The intercept valve of claim 2, characterised in that the elastic means (21) are constituted by a spring having a first end (23) housing the widening (13) and an opposite end (24) resting on the striker element (19) of the obturator (14).

6. The intercept valve of claim 1, characterised in that the means for activating (26) comprise:
    a seal (27) housed in the through hole (25) for preventing leakage of a fluid from the cavity (6);
    a lock nut (30) for keeping the seal pressed (27) on the section narrowing (32) of the through hole (25);
    a striker element (31), interpositioned between the lock nut (30) and the seal (27);
    a pivot (28) which can sealedly slide axially internally of the seal (27), the striker element (31) and the lock nut (30) following activation of a control lever (29).

7. The intercept valve of claim 4, characterised in that the pivot (28) exhibits a first end (28a) in contact with the obturator (14) and a second end (28b) in contact with the control lever (29).

8. The intercept valve of claim 1, characterised in that the first annular body (9) and the second annular body (10) are made of a synthetic material.

9. The intercept valve of claim 1, characterised in that the first section change (7) and the second section change (8) are reductions of section.

* * * * *